(12) United States Patent
Macan tSaoir et al.

(10) Patent No.: US 12,242,804 B2
(45) Date of Patent: Mar. 4, 2025

(54) DYNAMIC TYPEAHEAD SUGGESTIONS FOR A TEXT INPUT

(71) Applicant: International Business Machines Corporation, Armonk, NY (US)

(72) Inventors: Seamus R. Macan tSaoir, Navan (IE); Ahmed M. M. R. Salem, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 17/449,107

(22) Filed: Sep. 28, 2021

(65) Prior Publication Data

US 2023/0101701 A1  Mar. 30, 2023

(51) Int. Cl.
*G06F 3/0482* (2013.01)
*G06F 16/9532* (2019.01)
*G06F 40/274* (2020.01)

(52) U.S. Cl.
CPC .......... *G06F 40/274* (2020.01); *G06F 3/0482* (2013.01); *G06F 16/9532* (2019.01)

(58) Field of Classification Search
CPC ... G06F 40/274; G06F 16/9532; G06F 3/0482
See application file for complete search history.

(56) References Cited

U.S. PATENT DOCUMENTS

| | | | | |
|---|---|---|---|---|
| 7,185,271 B2 * | 2/2007 | Lee | .......................... | G06F 16/95 707/E17.107 |
| 7,908,287 B1 * | 3/2011 | Katragadda | ........... | G06F 40/274 707/723 |
| 8,601,019 B1 * | 12/2013 | Weininger | ........ | G06F 16/90324 707/769 |
| 9,665,246 B2 * | 5/2017 | Zhai | ...................... | G06F 40/237 |
| 10,606,895 B2 * | 3/2020 | Wakankar | ............. | G06F 16/248 |
| 11,080,314 B2 * | 8/2021 | Amacker | ................ | H04L 67/02 |
| 2004/0030540 A1 | 2/2004 | Ovil et al. | | |

(Continued)

FOREIGN PATENT DOCUMENTS

CN 101346717 A 1/2009

OTHER PUBLICATIONS

"Taiwan International Search Report", Patent Reference P202101998TW01, Application No. 111119801, Filed May 27, 2022, Received Jul. 19, 2020, 18 pages.

(Continued)

*Primary Examiner* — Anil K Bhargava
(74) *Attorney, Agent, or Firm* — Aaron Pontikos

(57) ABSTRACT

Several aspects are provided for dynamic typeahead suggestions for a text input. A first aspect receives a user input in the form of natural language text formed of a series of characters typed by a user. The first aspect provides a set of typeahead suggestions for the user input as the user input is typed or amended with the set of typeahead suggestions retrieved for a subtext within a current dynamic window formed of a start position and an end position in the user input independent of future user input. The first aspect generates multiple independent sets of typeahead suggestions for the user input, using different dynamic windows as the user input is received until confirmation of a final text input including any selections from the independent sets of typeahead suggestions.

25 Claims, 9 Drawing Sheets

(56) References Cited

U.S. PATENT DOCUMENTS

| | | | |
|---|---|---|---|
| 2012/0265779 A1* | 10/2012 | Hsu | G06F 16/3322 |
| | | | 707/E17.074 |
| 2014/0195519 A1* | 7/2014 | Holt | G06F 16/3322 |
| | | | 707/722 |
| 2018/0101599 A1* | 4/2018 | Arnold | G06F 40/274 |
| 2018/0108093 A1* | 4/2018 | Podgorny | G06N 7/01 |
| 2018/0203863 A1* | 7/2018 | Hansson | G06F 16/3322 |
| 2019/0018885 A1* | 1/2019 | Wakankar | G06F 16/90324 |
| 2019/0138540 A1* | 5/2019 | Hu | G06F 16/90324 |
| 2019/0171727 A1* | 6/2019 | Wakankar | G06N 5/046 |
| 2019/0171728 A1 | 6/2019 | Wakankar | |
| 2019/0379616 A1* | 12/2019 | Pulugurtha | H04L 51/02 |
| 2020/0311165 A1* | 10/2020 | Shukl | G06F 16/9537 |
| 2021/0049212 A1* | 2/2021 | Weber | G06F 40/30 |
| 2023/0056176 A1* | 2/2023 | Yiming | G06F 3/147 |
| 2023/0281398 A1* | 9/2023 | Peleg | G06F 40/30 |
| | | | 704/9 |
| 2023/0325610 A1* | 10/2023 | Peleg | G06F 3/04847 |
| | | | 704/9 |

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

DYNAMIC TYPEAHEAD SUGGESTIONS FOR A TEXT INPUT

BACKGROUND

The present invention relates to text input processing, and more specifically, to dynamic typeahead suggestions for a text input.

Typeahead, also known as autocomplete or autosuggest, is a language prediction tool that many search interfaces of search engines use to provide suggestions for users as they type in a query. In general, typeahead menus drop down below the search input field as users type and change with each keystroke to provide increasingly accurate predictions. Similar text input fields may be used in a range of applications. Typeahead of search input text is used for convenience, correction, or improvement, for example, to improve context relevance.

Domain-specific search engines are useful because they offer increased accuracy and extra functionality not possible with the general, Web-wide search engines. When a user wants to find a domain-specific document, there are some characteristics of the use-case that make existing typeahead approaches less suitable.

Typeahead suggestions are typically based on the most frequent historical queries that have been made using the search input. However, in a domain-specific search, the most frequent historical queries are not likely to match highly specific search requirements.

Another problem with domain-specific search engines is that domain entities, although fixed in number, can be highly variable in how they are expressed, which can make user search input very challenging if the incorrect terminology is used.

An existing solution is to make detected entities read-only, to make it clear that this part of the query is no longer modifiable and no longer input to the typeahead process. Locking such entities early has negative consequences as well, such as the prevention of further expansions on that term as a possible prefix of larger terms.

SUMMARY

According to an aspect of the present invention, there is provided a computer-implemented method for dynamic typeahead suggestions for a text input, comprising: receiving a user input in the form of natural language text formed of a series of characters typed by a user; providing a set of typeahead suggestions for the user input as the user input is typed or amended with the set of typeahead suggestions retrieved for a subtext within a current dynamic window formed of a start position and an end position in the user input independent of future user input; generating multiple independent sets of typeahead suggestions for the user input, using different dynamic windows as the user input is received; and confirming a final text input including any selections from the independent sets of typeahead suggestions.

This provides the advantage of generating multiple independent sets of typeahead suggestions for different parts of the user input by using different dynamic windows as the user input is received.

The dynamic window may be dynamically enlarged as the user types a subtext and the typeahead suggestions are dynamically updated. Providing a set of typeahead suggestions may use a fixed start position in the user input from which a typeahead mechanism looks for typeahead suggestions and the input to the typeahead mechanism may update with text from the fixed start position as the user continues typing and updates the set of typeahead suggestions.

The method may further comprise selecting one of the sets of typeahead suggestions for the current dynamic window and replacing at least the subtext of the current dynamic window with the text of the selected typeahead suggestion. The method may further comprise starting a new dynamic window with the start position of the new dynamic window at the end of the text of the selected typeahead suggestion.

The method may further comprise starting a new dynamic window when no typeahead suggestions are available for the current window, with the start position of the new dynamic window being a next token prefix of the user input. The method may further comprise starting a new dynamic window when a user override of typeahead suggestions is received.

Providing a set of typeahead suggestions for a subtext of a current dynamic window may start after a threshold number of characters are received of the subtext.

Providing a set of typeahead suggestions, when a user input is amending previous text input of the user input, may use a current dynamic window that progressively expands in one or both directions from the current input position. Progressively expanding the current dynamic window may include progressively expanding the window in alternating directions from a current input position. Progressively expanding the window may move a start position of the window to include a previous token of the user input in the subtext. Progressively expanding the window may move an end position of the window to include a following token of the user input in the subtext. The method may further comprise using a wildcard to indicate search text to be inserted in a current subtext.

According to another aspect of the present invention, there is provided a computer-implemented method for dynamic typeahead suggestions for a text input, comprising: defining a current dynamic window formed of a start position and an end position in a user text input to provide subtext of the user text input for a typeahead suggestion mechanism independently of a remainder of user text input; dynamically changing definition the current dynamic window as text is received from the user to the text input; and triggering a new dynamic window when no suggestions are available for the current dynamic window or when a selection is received of a suggestion for the current dynamic window.

A dynamic window may be defined as a prefix dynamic window with a fixed start position and a variable end position that moves to include text input by the user. A dynamic window may also be defined as a bidirectional dynamic window with a variable start position and a variable end position that move bidirectionally to include tokens on either side of a modifying text input by the user.

According to another aspect of the present invention, there is provided a system for dynamic typeahead suggestions for a text input, comprising: a processor and a memory configured to provide computer program instructions to the processor to execute the function of the components: a user input receiving component for receiving a user input in the form of natural language text formed of a series of characters typed by a user; a dynamic window component for defining a current dynamic window formed of a start position and an end position in the user input; a typeahead suggestion providing component for providing a set of typeahead suggestions retrieved for a subtext within a current dynamic window independent of future user input and for generating multiple independent sets of typeahead suggestions using different dynamic windows as the user input is received; and a final input confirming component for confirming a final text input including any selections from the independent sets of typeahead suggestions.

The dynamic window component may further comprise a prefix based window component for defining the current dynamic window with a fixed start position in the user input from which a typeahead mechanism looks for typeahead suggestions and an end position that moves to include user input as the user continues typing.

The system may also further comprise: a suggestion selection component for selecting one of the set of typeahead suggestions for the current dynamic window replacing at least the subtext of the current dynamic window with text of the selected typeahead suggestion; and a selection triggering component for triggering the start of a new dynamic window with a start position of the new dynamic window at an end of the text of the selected typeahead suggestion.

The system may further comprise a no suggestion triggering component for starting a new dynamic window when no suggestions are available for the current dynamic window, with a start position of the new dynamic window being a next token prefix of the user input.

The typeahead suggestion providing component may further comprise a threshold component for providing the set of typeahead suggestions for the subtext of the current dynamic window once a threshold number of characters are received of the subtext.

The dynamic window component may further comprise a bidirectional window component for providing a set of typeahead suggestions when a user input is amending previous text of the user input by defining the current dynamic window to progressively expand in one or both directions from a current input position.

According to a further aspect of the present invention, there is provided a system for dynamic typeahead suggestions for a text input, comprising: a processor and a memory configured to provide computer program instructions to the processor to execute the function of the components: a dynamic window component for defining a current dynamic window formed of a start position and an end position in a user text input to provide subtext of the user text input for a typeahead suggestion mechanism independently of a remainder of user text input and dynamically changing the window definition as text is received from the user to the user text input; and a new window triggering component for triggering a new dynamic window when no suggestions are available for the current dynamic window or when a selection is received of a typeahead suggestion for the current dynamic window.

The dynamic window component may further comprise a prefix based window component for defining a prefix dynamic window with a fixed start position and a variable end position that moves to include text input by the user.

The dynamic window component may further comprise a bidirectional window component for defining a bidirectional dynamic window with a variable start position and a variable end position that move bidirectionally to include tokens on either side of a modifying text input by the user.

According to a yet further aspect of the present invention, there is provided computer program product for dynamic typeahead suggestions for a text input, the computer program product comprising a computer readable storage medium having program instructions embodied therewith, the program instructions executable by a processor to cause the processor to: receive a user input in the form of natural language text formed of a series of characters typed by a user; provide a set of typeahead suggestions for the user input as the user input is typed or amended with the set of typeahead suggestions retrieved for a subtext within a current dynamic window formed of a start position and an end position in the user input independent of future user input; generate multiple independent sets of typeahead suggestions for the user input, using different dynamic windows as the user input is received; and confirm a final text input including any selections from the independent sets of typeahead suggestions.

According to a further aspect of the present invention, there is provided a computer program product for dynamic typeahead suggestions for a text input, the computer program product comprising a computer readable storage medium having program instructions embodied therewith, the program instructions executable by a processor to cause the processor to: define a current dynamic window formed of a start position and an end position in a user text input to provide subtext of the user text input for a typeahead suggestion mechanism independently of future user text input; dynamically change a definition of the current dynamic window as text is received from the user to the user text input; and trigger a new dynamic window when no suggestions are available for the current dynamic window or when a selection is received of a typeahead suggestion for the current dynamic window.

The computer readable storage medium may be a non-transitory computer readable storage medium and the computer readable program code may be executable by a processing circuit.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

Figure 1:
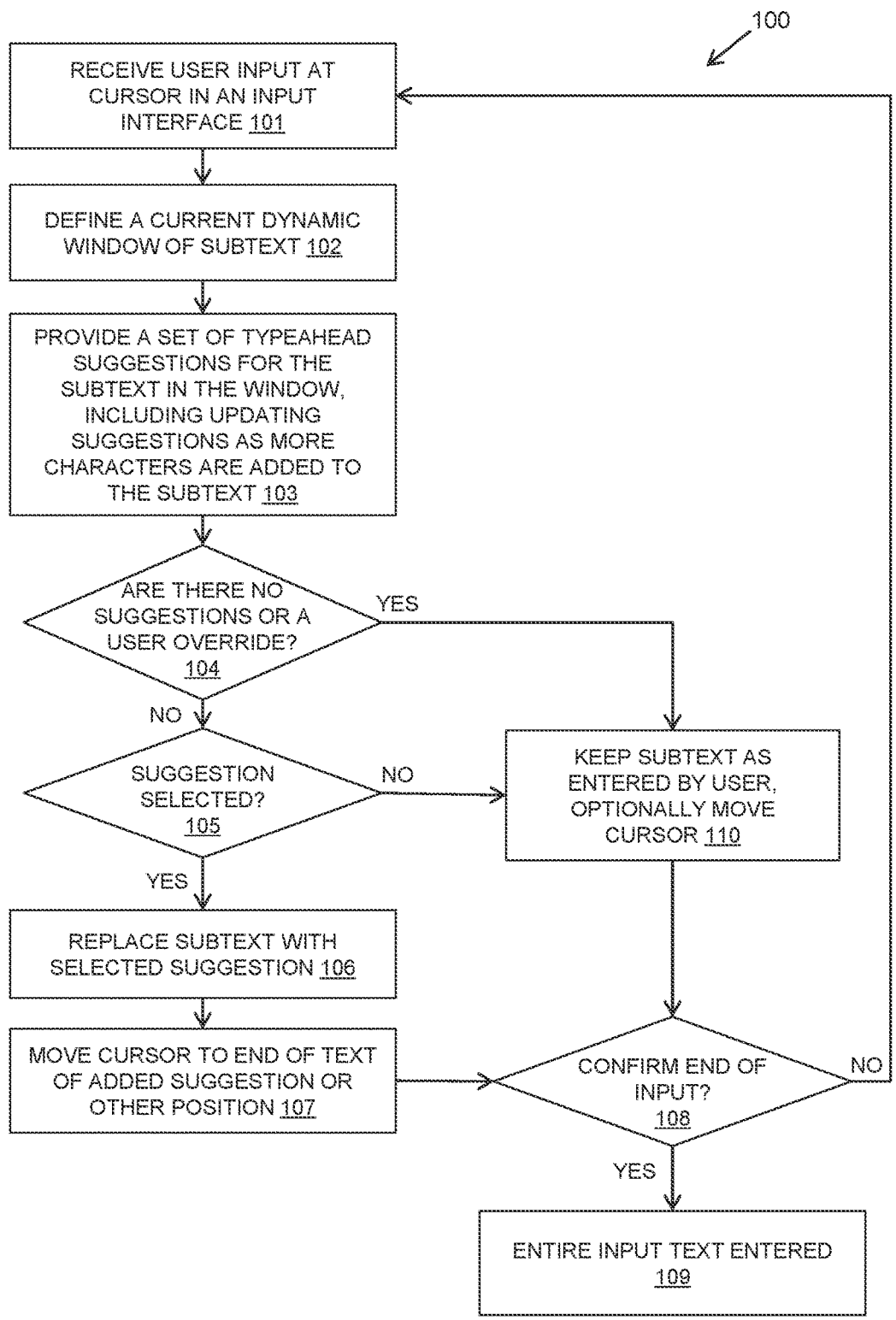
FIG. 1 is a flow diagram of an example embodiment of a method in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

A method and a system are described that provide an intelligent concept-based dynamic window for typeahead on a single natural language text input. Multiple dynamic windows are used during the user input to produce multiple independent sets of typeahead suggestions. The method and system may be used in environments in which a natural language text input is made and terms selected before confirming the input. The method and system are applicable to a search environment in which the natural language input is used to carry out a search. In particular, the method is useful in a domain-specific search.

The method receives a user input of natural language text input as the user input is input by a user in a text input field or interface. User input may be made by typing the text input a character at a time and, optionally, moving the input cursor and modifying existing portions of the text input. Other methods of user input may be used, such as dictation with speech to text conversion, resulting in a word or partial word input at a time, and such inputs are considered to fall under the term "type".

The described method provides a set of typeahead suggestions for the user input as the user input is typed or amended with the set of typeahead suggestions retrieved for a subtext within a current dynamic window formed of a start position and an end position in the user input independent of the remainder of user input (i.e., future text received as part of the user input). In general, the window, which is dynamic, is used as a boundary on the lexical context for which typeahead suggestions are provided. The typeahead suggestions for each dynamic window are independent of the remainder of the text input resulting in multiple independent typeahead suggestions being made for the entire text input. Each window may result in typeahead suggestions for individual selection by the user before inputting or amending the remaining text input.

The input to the typeahead mechanism lookup is dynamically changed as the subtext is entered in the dynamic window so that the suggestions returned are meaningful in the immediate context of the user's typed phrase and not based on the entire content of the text input.

During the composition of the user input, multiple independent sets of typeahead suggestions may be generated using different dynamic windows. The multiple dynamic windows focus on specific portions of the natural language text of the user input. Multiple rounds of typeahead suggestions are made for a single natural language text input, as the user modifies their text, facilitating multi-suggestion output for a single text input.

A final text input is confirmed by the user that includes any selections made from the independent sets of typeahead suggestions. The final text input may include also some of the user's original input for which suggestions were not available or were not selected.

The described method may be integrated with other input interfaces to provide additional functionality to give a user flexibility when using typeahead suggestions.

The description below uses the term "token" in that a natural language text input is formed of multiple tokens. Tokens are groups of characters that may or may not have meaning. Tokens can be distinguished from each other using the syntactical rules of the language used, such as spaces between words in English. In languages like Chinese, it is more complex but the same applies in the sense that syntactic rules dictate which characters are grouped together.

Typeahead suggestions provide a list of possible suggestions for a replacement of text of the dynamic window. These suggestions may be provided as a dropdown menu for selection by the user. The suggestions are in the form of "entities". An entity is a token or sequence of tokens that acts as a reference to a specific meaning in the language. For example, the token "home" refers to one meaning and "home loan", "home improvement", "home base" (as in baseball), "home alone" (the Christmas movie), have new meanings that contain the same token, and as such are distinct entities.

Referring to FIG. 1, a flow diagram 100 shows an example embodiment of the described method of providing dynamic typeahead suggestions for a text input.

The method receives 101 a user input in the form of natural language text formed of a series of characters input by a user in an input interface with input being made at a cursor position. The user input may be typed to input characters to form tokens to build up the user input. This may be provided a character at a time or a phonetic portion or word at a time, for example, if a speech-to-text input is used.

The method defines 102 a current dynamic window based on the location of the cursor. The current dynamic window includes a subtext formed of a start position and an end position in the user input. The start position is the position in the user's text input that marks the first character being input to the typeahead mechanism.

When starting with a blank input interface, the start position is 0, and the window goes as far as the user's cursor. As the user continues to type, the starting offset remains at 0 and the end position continues to be the position of the cursor. When adding to existing text in the input interface, the start position may be the initial new cursor position at the end of the existing text, usually at the start of a next token, and the window may be defined from this start position as the cursor moves as text is added.

When an existing text in the input interface is modified by moving the cursor position, the window definition is more complex to accommodate tokens either side of the cursor position in the subtext. This is described further below in relation to FIG. 4.

The method may provide 103 a set of typeahead suggestions for the subtext within the current dynamic window independent of the remainder of user input. The window is used to put a boundary on the lexical context. The window is dynamically enlarged as the user types the subtext.

The method may call a typeahead mechanism to provide the suggestions of entities to replace the subtext of the user input. The typeahead mechanism may make updated calls as more characters are added to the subtext of the window. In this way, the method that takes the user seriously in continuing to type rather than select a suggestion, so that the method continues to offer potentially relevant entities for the subtext.

The typeahead mechanism may start to provide a set of typeahead suggestions for a subtext of the window after a threshold number of characters are received of the subtext.

For example, three characters may be required before typeahead suggestions are provided.

The method may determine 104 if there are no suggestions for a current window or if the user overrides further suggestions. Typeahead suggestions may be provided by existing typeahead suggestions mechanisms that are typically based on the most frequent historical entities that have been retrieved using the input text.

If there are suggestions, the method may determine 105 if a suggestion is selected by the user. If so, the subtext is replaced 106 with the selected suggested entity text and the selection is considered to be a finished product for that subtext. Additional text in the user input may also be included in the replacement or deleted as chosen by the user.

The cursor position may move 107 to the end of the added entity text of the selected suggestion or, optionally, another position in the text input as chosen by the user.

The method may receive confirmation 108 that this is the end of the input by the user. This may require a positive input by the user to indicate that the input is finished. If so, entire text input may be entered 109, which may include any selections from the independent sets of typeahead suggestions. If it is not confirmed 108 that this is the end of the input by the user, the method may loop to receive 101 user input at the new cursor position in the input interface.

If it is determined that there are no suggestions 104 for a window or if there are still suggestions and the user ignores the suggestions 105 and overrides further suggestions, the subtext is kept 110 as entered by the user.

No suggestions 104 may occur if the user input is very specific and the typeahead mechanism does not find any suitable suggestions. This may occur if a user ignores any initial suggestions and keeps typing in the window.

As soon as there are no more matching suggestions for the user's typed input and the cursor is not moved by the user or the input is not confirmed 108 as ended by the user, the start position of a next dynamic window moves to the position of the first character of the subsequent token in the user's input and the method loops to receive 101 user input and attempts to retrieve suggestions for this new window on the input. If no suggestions are again found, the starting position of a next dynamic window proceeds to the position of the first character in the next token, and so on, until either suggestions are found or no further tokens remain to attempt retrieving suggestions.

The method may also keep 110 the subtext of the window if the user overrides the provision of more typeahead suggestions for the subtext of the window. The cursor position may be kept where the cursor position is at the end of the current subtext or moved to another position in the text input, as determined by the user. Such an override may reset the typeahead window to the user's cursor position even when there are still matching typeahead suggestions returning. Continuing to type will still produce matches that include the previous input, which may be out of context. The user may take a separate action to manually override that in order to restart the typeahead suggestion lookup from the new position. For example, an override action may be clicking "x" button on the suggestion display.

The method may confirm 108 if this is the end of the input by the user. This may require a positive input by the user to indicate that the input is finished. If so, entire text input may be entered 109, which may include the direct user input. If it is not confirmed 108 that this is the end of the input by the user, the method may loop to receive 101 user input at the new cursor position in the input interface.

In this way, the method may loop repeatedly prompted by selection of a suggestion to replace the subtext of a dynamic window or by there being no suggestions for the subtext. This generates multiple independent sets of typeahead suggestions for the user input, using different dynamic windows during the course of the composition of the user input.

In domain-specific searches, domain entities often overlap with each other, so the described method provides a way to allow the user to select something, but also not to have their selection overly influence a subsequent entity lookup. The described method also addresses the problem with domain-specific search engines in which domain entities can be highly variable in how they are expressed, which can make user search input very challenging if the incorrect terminology is used.

Two aspects of the described method are described in further detail. In a first aspect described in a flow diagram in FIG. 2 and illustrated by an example in FIG. 3, a method is described in which the text input is a flow of input with the cursor moving linearly along the input interface continuously appending to the text input. In other words, in this aspect, the user does not move the cursor to modify existing text input in the input interface. This method uses a prefix lookup only in the dynamic windows.

Figure 4:
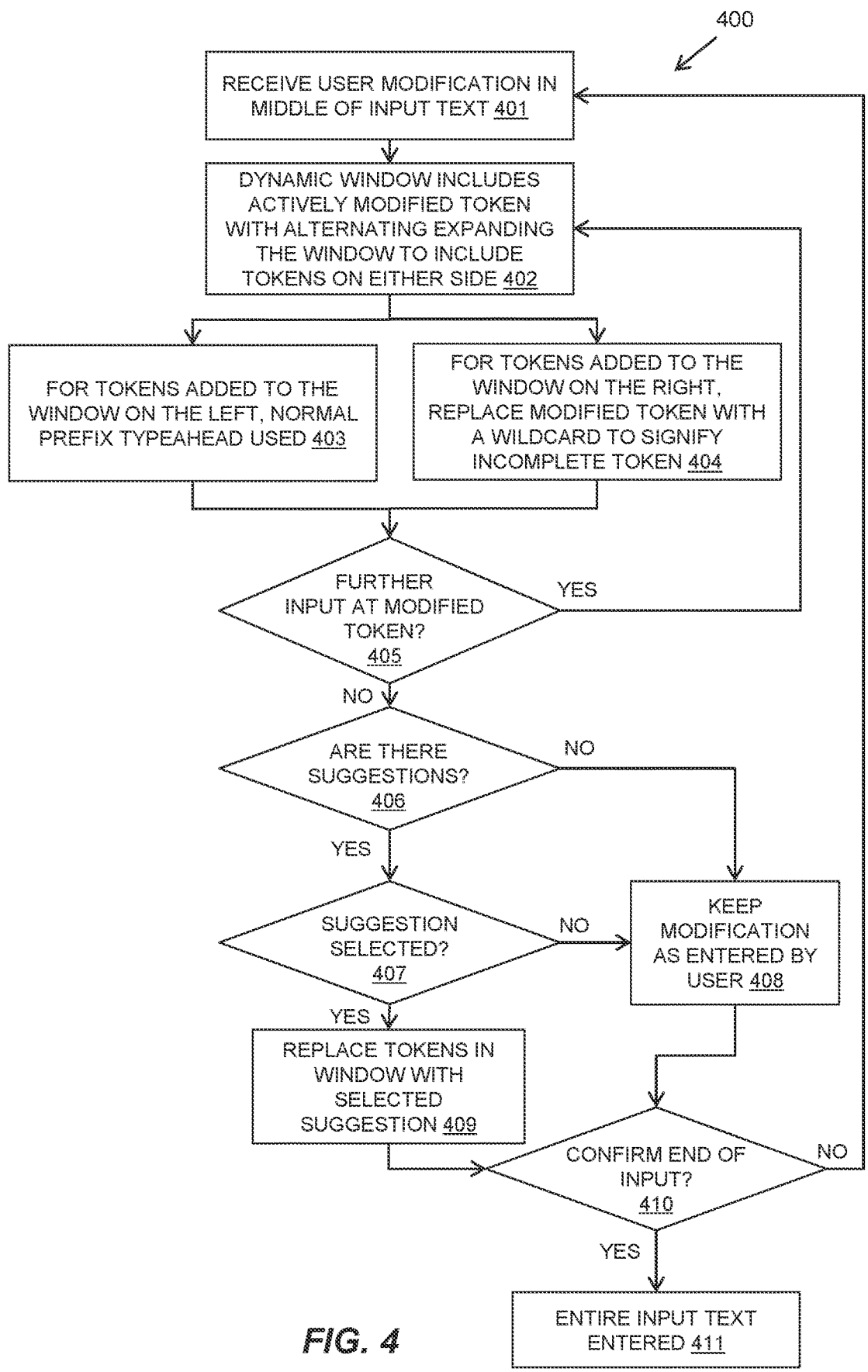
FIG. 4 is a flow diagram of an example embodiment of another aspect of the method in accordance with the present invention.
Figure 5:
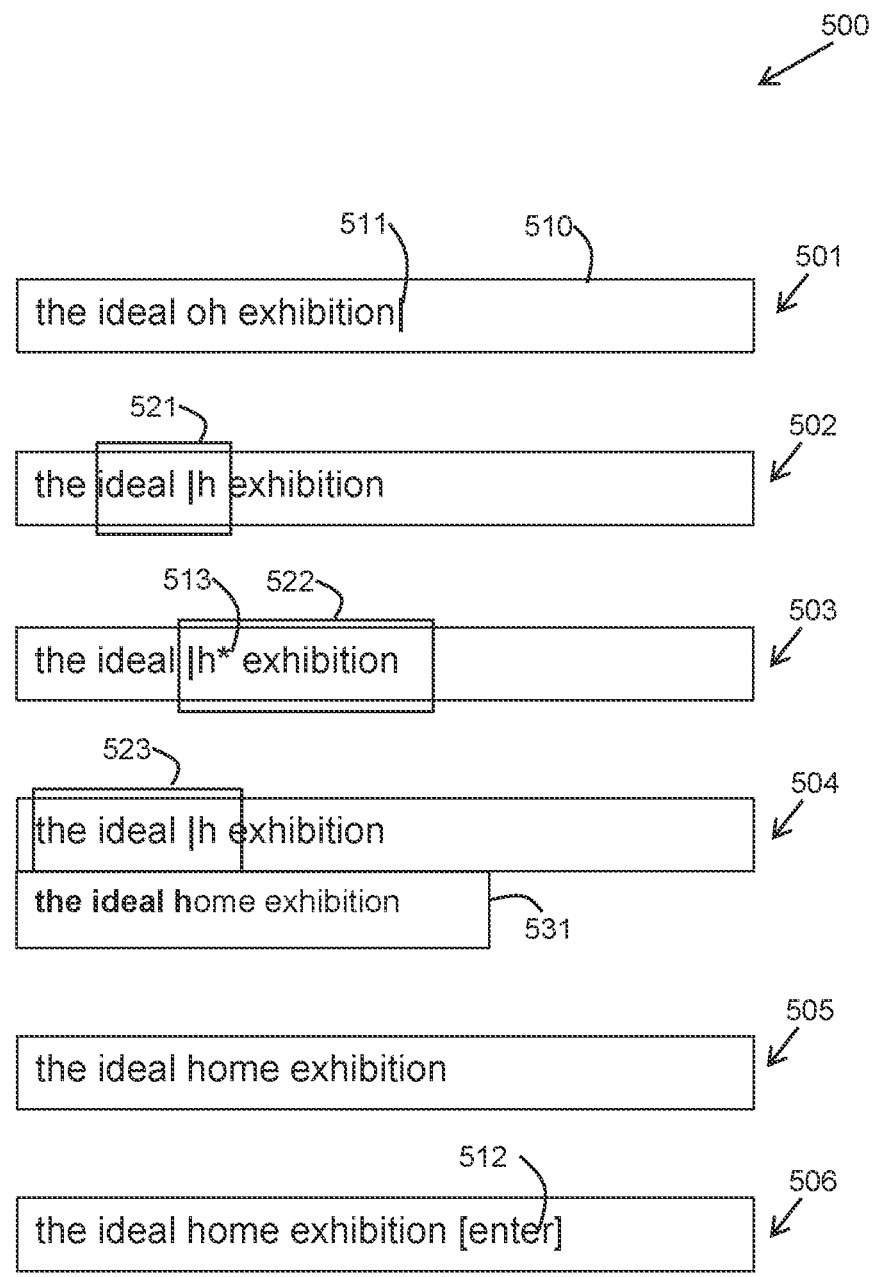
FIG. 5 is a schematic diagram illustrating an example the aspect of the method of FIG. 4.

In a second aspect described in a flow diagram in FIG. 4 and illustrated by an example in FIG. 5, a method is described in which the text input is modified by the user moving the cursor to modify existing text input in the input interface. This method uses a more complex method of lookup in the dynamic windows.

Figure 2:
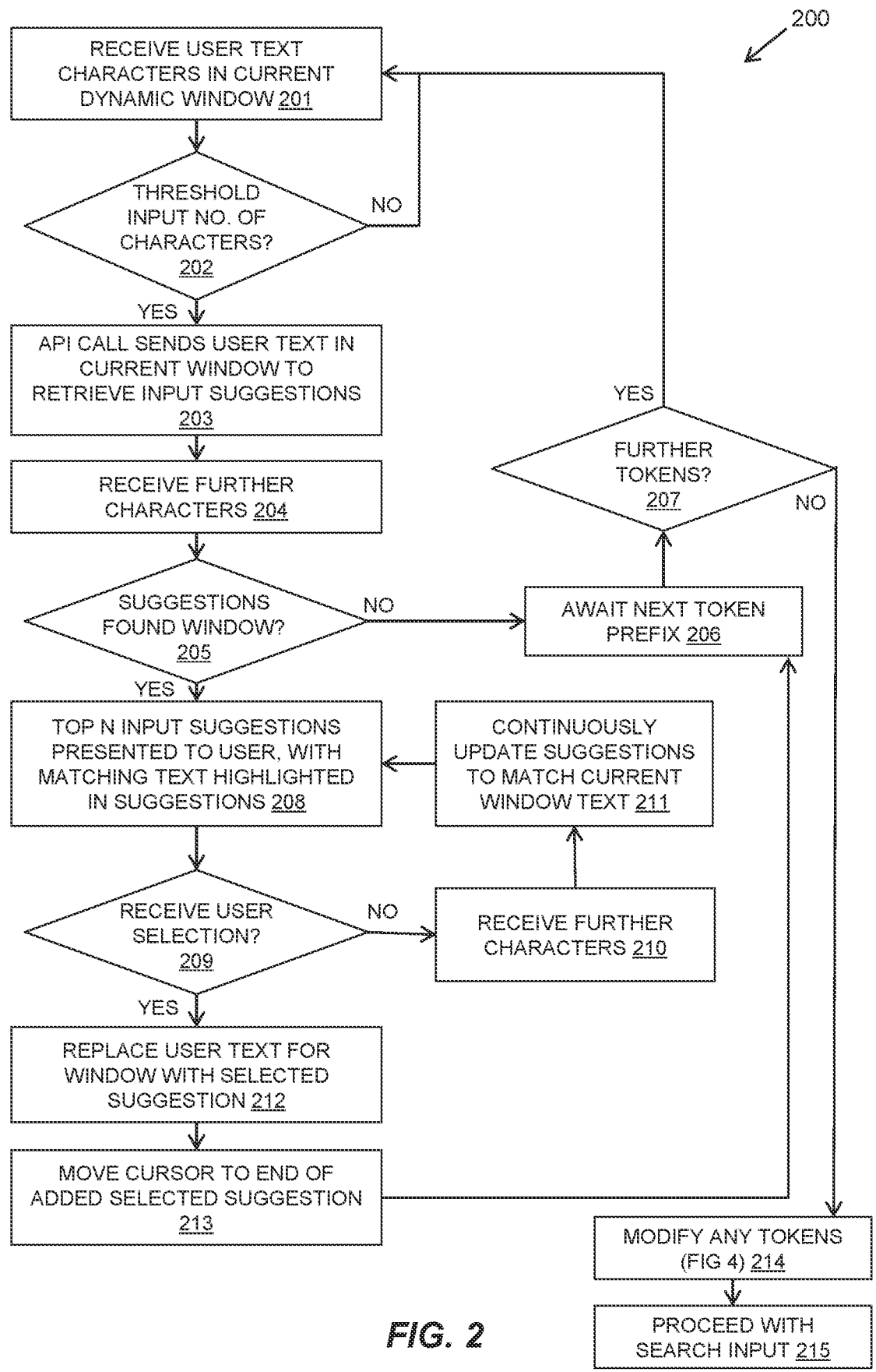
FIG. 2 is a flow diagram of an example embodiment of an aspect of the method in accordance with the present invention.

Referring to FIG. 2, a flow diagram 200 shows an example embodiment of the first aspect of providing a dynamic typeahead window for a linear text input.

The method may receive 201 user input characters of their text input, for example, as user typed input into an input interface. The input defines a dynamic window for typeahead suggestions. It may be determined 202 if a threshold number of characters is met, for example, when the text input has at least three characters. If the threshold is not met, the method may wait to receive 201 additional user input characters.

The method makes an application programming interface (API) call to a typeahead mechanism to send 203 the user text in the current window to retrieve suggestions. As the user types their further input, suggestions may start to appear after the threshold number of characters. The method may receive 204 further characters input by the user and may update the suggestions. It may be determined 205 if suggestions are found.

If no suggestions are found for what the user has typed so far, no further attempts will be made to retrieve suggestions until the user starts a new token, the process will then restart from that point. Therefore, the method awaits 206 a next token prefix that will be the start of a new dynamic window.

In this way, suggestions may be found as the user types one or more tokens, but if before the user has completed their current input there are no suggestions found, the window starting position moves forward to the first character in the subsequent token of the text already input. This move of the window starting positions continues until suggestions are found or no tokens remain.

It may be determined 207 at this point if there are any further tokens being input by the user. If there are not, the method may determine if any modifications are being made 214 to the text input and may proceed to confirm 215 the text input entry.

If there are further tokens being input, the method loops to start a new typeahead process with a new dynamic window starting with the prefix of the next input token. The prior text input is ignored for the purposes of the new typeahead set of suggestions, which reduces unnecessary calls for prefix lookup.

If suggestions are found 205, top N suggestions may be presented 208 to the user. If there are less than N suggestions, the available suggestions may be presented. Matching user text may be shown in highlighted text, for example in bold, in the suggestions, to differentiate with the suggestion entity.

It may be determined 209 if a user selection is made. If the user ignores the suggestions and continues to type further characters 210, the suggestions may be continuously updated 211 to match the current user input and the new top N suggestions may be presented 208 until no suggestions are found 205. Essentially, as soon as no suggestions are found, action is taken to move the window to a next token.

If a user makes a selection 209, this may be by scrolling up and down the N suggestions and selecting a single suggestion from the list, at least the user text in the window is replaced 212 with the text of the selected suggestion entity.

Optionally, more of the user text input than that of the current window may be replaced. If suggestions are found for only a subset of the user's entire text input, this may be because the set of terms recognized by the typeahead mechanism is not universal. The initial token(s) that were not recognized and subsequently ignored for typeahead lookup may have been part of the user's originally intended input. As the user has now selected a suggestion, they may like to replace their entire text with that suggestion.

The cursor 213 is moved to the end of the added selected suggestion and the method may await 206 a next token prefix and the method may continue. A starting position of next window to typeahead will be the prefix of the next token, if there is one.

It may be determined 207 at this point if there are any further tokens being input by the user. If there are not, the method may determine if any modifications are being made 214 to the text input, in which case the method described in FIG. 4 may be used, and may proceed to confirm 215 the text input entry.

The dynamic input to the typeahead mechanism is provided by the dynamic window. In the aspect of a linear input, the window may be defined in terms of a single digit describing the starting offset in the text from which the typeahead mechanism looks for suggestions. The input to the typeahead mechanism is everything after that starting offset, as the user continues typing. The starting offset is moved forward for a next window looking for suggestions to be presented to the user. In this way, ambiguous text that matches a portion of multiple concepts will not get in the way of the interpretation intended by the user, which is no longer blocked from the inclusion of the irrelevant portion of the overlap.

Figure 3:
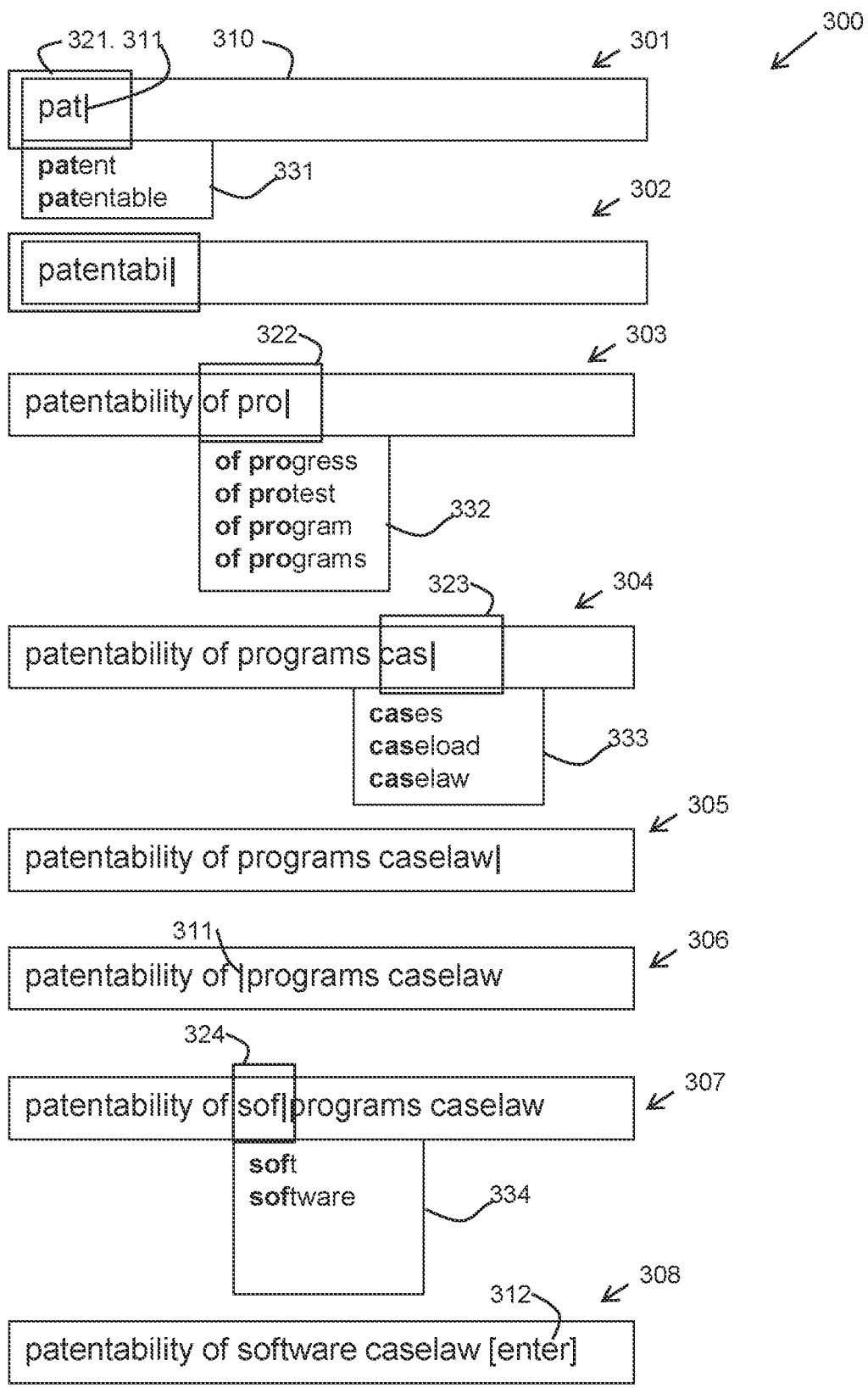
FIG. 3 is a schematic diagram illustrating an example of the aspect of the method of FIG. 2.

Referring to FIG. 3, a schematic diagram 300 illustrates an example of the method of FIG. 2. An input interface 310 is shown in which user text input is received. A cursor 311 showing a current position of the user input is shown. A series of stages 301-308 of a text input is illustrated in FIG. 3.

In a first illustrated stage 301, a first dynamic window 321 is defined in which the user has input three characters "pat". A typeahead drop down menu 331 shows possible entity suggestions for selection. At a second illustrated stage 302, the user keeps typing as the suggestions are not suitable. The user finishes the word of "patentability" for which there are no suggestions found. This lack of suggestions triggers a new dynamic window to be started.

As the user enters a space (i.e., hits the space key) to start a next token, a new second dynamic window 322 is started with a starting position of the beginning of the next token "of". The third illustrated stage 303 shows the second dynamic window 322 with the user input of "of pro". A typeahead drop down menu 332 shows possible entity suggestions for selection of which one, "of programs" is selected by the user and the user's input in the window 322 "of pro" is replaced with the selected suggestions "of programs".

A new third dynamic window 323 is triggered by the selection of the suggestion of "of programs" and has a starting position after the added text "of programs". A fourth illustrated stage 304 shows the third dynamic window 323 with the user input of "cas". A typeahead drop down menu 333 shows possible entity suggestions for selection of which one, "caselaw", is selected by the user and the user's input in the window 323 "cas" is replaced with the selected suggestions "caselaw".

The fifth illustrated stage 305 shows the final linear text input of "patentability of programs caselaw".

In the sixth illustrated stage 306, the user decides to edit the token "programs" and moves the cursor 311 to the start of the token "programs" and starts to type "sof". This triggers a fourth dynamic window 324 with a starting position where the cursor was moved to and dynamically growing as the user enters the text "sof" as shown in the seventh illustrated stage 307. A typeahead drop down menu 334 shows possible entity suggestions for selection of which one, "software", is selected by the user and the user's input in the window 324 "sof" is replaced with the selected suggestions "software". This aspect is described further below in relation to FIGS. 4 and 5. How a window 324 in the middle of the text input grows depends on the context, such as the position of the user's cursor, the presence of multiple tokens either side of the cursor, etc.

The eighth illustrated stage 308 shows the final linear text input of "patentability of software caselaw", which the user is happy with and confirms by pressing [enter] 312 key.

Referring to FIG. 4, a flow diagram 400 shows an example embodiment of the second aspect of providing a dynamic typeahead window for a text input modification. The text input modification may modify a token of an existing text input. This may be carried out after the input of a linear text input, or part way through the input of a linear text input as a mid-input modification before reverting to the end of the linear text to continue input.

This embodiment envisions the user's modification of the natural language text input in the middle of the input. In such cases, the typeahead window is dynamically changed to extend backwards from the user's currently modified token and alternately extend forwards to the next unmodified token and beyond, in order to find suggestions. A more complex bidirectional shifting of the window is employed in order to restrict the output to as small a relevant set as possible.

This embodiment provides a set of typeahead suggestions when a user input is amending previous text input of the user input and uses a current dynamic window that progressively expands in one or both directions from the current input position. This may progressively expand the current dynamic window in alternating directions from the current input position. The current dynamic window may move a start position of the window to include a previous token in the subtext of the window or may move an end position of the window to include a following token in the subtext. This may include using a wildcard to indicate that search text is to be inserted in a current subtext.

The method may receive 401 a user modification of an existing natural language text input. A dynamic window is used 402 for typeahead suggestions defined for the actively modified token along with tokens to either side, with the window enlarging bidirectionally, while the user continues typing and ignoring any previously presented suggestions.

Separate typeahead queries are required in this scenario, one for each direction. For tokens added from the left of the user's modified token 403, the normal prefix typeahead can be used. For tokens added from the right 404, the user's modified token is replaced with a wildcard character to the right of their cursor, to signify that the token is only partially complete in that direction. A regex approach is, therefore, required for the query with content from this direction.

It is determined 405 if there are further inputs at the modified token and, if so, the dynamic window continues to enlarge. If the user continues typing in the middle, and adds a new token, the bidirectional typeahead process restarts 402 from the new modified token.

It is also determined 406 if there are suggestions for the current dynamic window. The window will stop extending in any given direction as soon as no suggestions are found for that input. Once, no suggestions are found, the method may keep 408 the modification as entered by the user.

If there are suggestions, the method may determine 407 if a suggestion is selected by the user. If so, the tokens in the dynamic window are replaced 409 with the selected suggested entity text. If not, the tokens in the dynamic window may be kept 408 as modified by the user.

The method may receive confirmation 410 that this is the end of the input by the user. This may require a positive input by the user to indicate that the input is finished. If so, entire text input may be entered 411. If it is not confirmed 410 that this is the end of the input by the user, the method may loop to receive 401 user input at the new cursor position in the input interface.

In this aspect of modifying a text input, once the user moves their cursor to a position before the end of their text input, and inputs a new character, the window start position and end position will change. How they change will depend on whether the user modifies an existing token, starts a new token in between, at the very beginning of the existing input, or at the final token in the existing input.

As a user starts editing an existing token, the window start and end positions will change to the start and end of that token, even though the user may be modifying in the center of that token. This token is then the input to the typeahead mechanism. If no suggestions are found for that window, the starting offset is moved to the position of the first character in the preceding token (if there is one), and end position of the window stays the same. If no suggestions are found for this window, (or if there was no preceding token) the start position of the window resets to the position of the first character in the token the user is modifying, and the end offset moves to the position of the final character in the subsequent token of the user's input (if there is one). Again, an attempt is made to retrieve suggestions. If none is found, the window continues moving first to the left (toward preceding tokens) and then to the right (toward subsequent tokens), until either suggestions are found for a window, or all tokens are exhausted. As soon as the user inputs a new character, this process starts again until suggestions are found or all options are exhausted.

If the user inputs a new token between existing tokens, the same mechanism is applied, where the new token takes the place of the modified token in the previous comment.

If the user inserts a new token at the beginning, the same mechanism is applied except that there are no proceeding tokens, so those options are skipped.

Similarly, if a user starts modifying the final token, only preceding tokens can be used in the same mechanism.

Referring to FIG. 5, a schematic diagram 500 illustrates an example of the method of FIG. 4. An input interface 510 is shown in which user text input is modified. A cursor 511 showing a current position of the user input is shown. A series of stages 501-506 of a text input is illustrated in FIG. 5.

A first illustrated stage 501 is shown with a text input of "the ideal oh exhibition" with the cursor 511 at the end of the text input. A user modifies their input in the middle of the text input by modifying the word "oh", deleting the letter "o". No attempt is made to find suggestions for "h" as it is not 3 characters long. At a second illustrated stage 502, a first dynamic window 521 is defined with a start position at the beginning of the previous token "ideal" and an end position at the end of the modified token. The input to the typeahead mechanism is therefore "ideal h". No suggestions are found for this input (i.e. it is not the start of any known term).

At a third illustrated stage 503, the dynamic window is redefined 522 to the right, and the input to the typeahead mechanism becomes "h.* exhibition", which uses a wild card regular expression 513 (for example, a Kleene star) to indicate that the typeahead mechanism should look for suggestions that start with "h" and then continue with any number of characters until they end with the text "exhibition". No such suggestions were found for this input.

A fourth illustrated stage 504, defines the dynamic window 523 back to the left, and extends to a further preceding token, expanding the typeahead window to cover "the ideal h". This matches the start of an existing known term, and this term is presented to the user: "the ideal home exhibition" 531.

All of the above, happens in the instant after the user deleted the character "o" from the word "oh", and now the user has a fully correct suggestion for their input that is known to exist in their dataset.

Since the suggestion also includes the subsequent word in their input, the user may decide to replace their entire input with the suggestion as shown in the fifth illustrated stage 505. Alternatively, on selection, the tokens of the user's existing input (but outside the typeahead window) that overlap exactly with the additional tokens of the suggestion, may be merged automatically. In this case, "exhibition" is a suitable candidate to merge.

If the user is now satisfied with the entire text input, the user may confirm the input by pressing an [enter] key 512.

Figure 6:
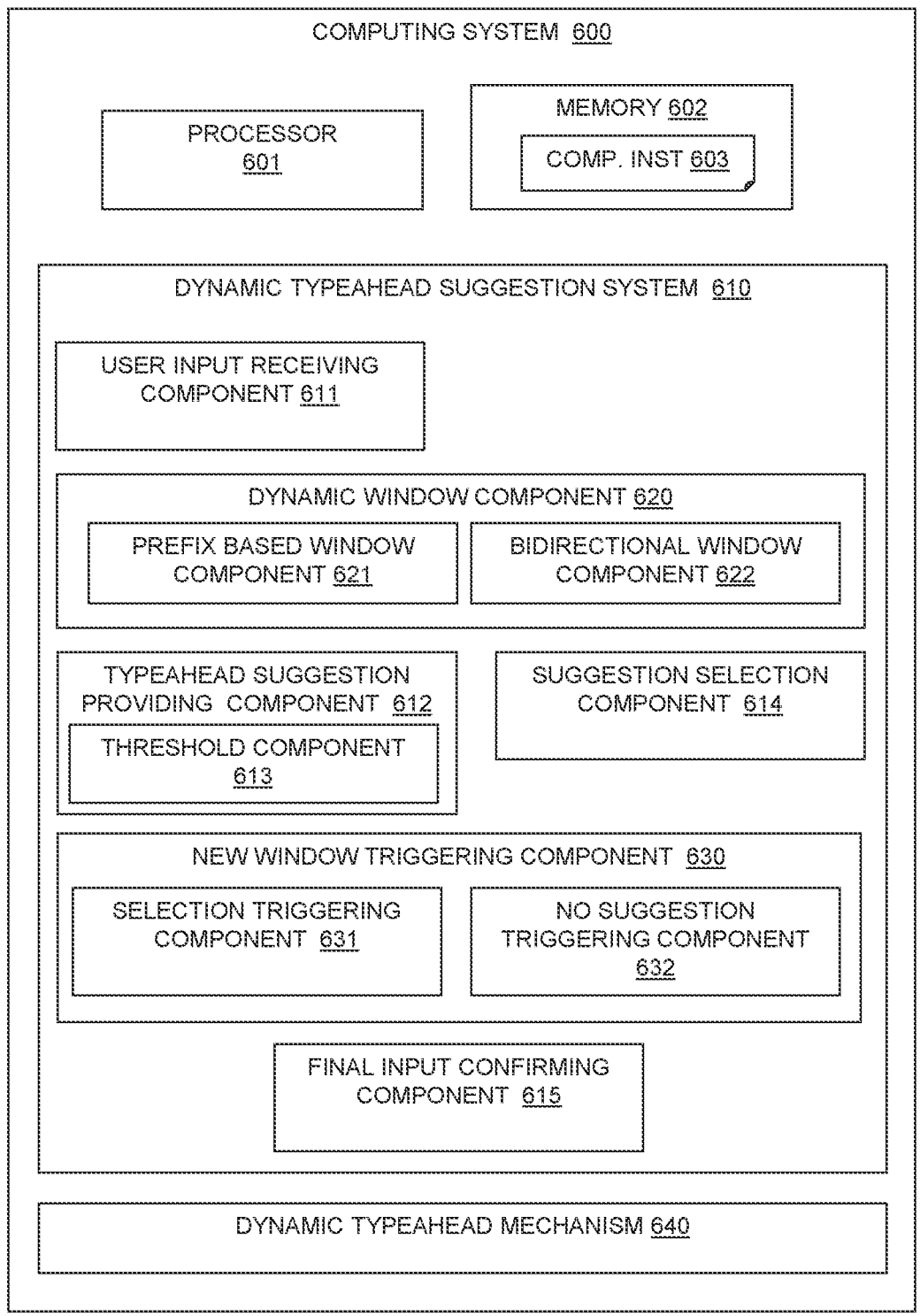
FIG. 6 is block diagram of an example embodiment of a system in accordance with the present invention.

Referring to FIG. 6, a block diagram shows a computing system 600 in which the described dynamic typeahead suggestion system 610 is provided.

The computing system 600 includes at least one processor 601, a hardware module, or a circuit for executing the functions of the described components which may be software units executing on the at least one processor. Multiple processors running parallel processing threads may be provided enabling parallel processing of some or all of the functions of the components. Memory 602 may be configured to provide computer instructions 603 to the at least one processor 601 to carry out the functionality of the components.

The described dynamic typeahead suggestion system 610 calls a typeahead mechanism 640 that may be provided at a same computing system 600 or remotely. The dynamic typeahead suggestion system 610 may be provided as a stand-alone component or as an add-on to another component such as a search browser.

The dynamic typeahead suggestion system 610 includes a user input receiving component 611 for receiving a user input in the form of natural language text formed of a series of words typed by a user and a dynamic window component 620 for defining a current dynamic window.

The dynamic window component 620 defines a current dynamic window formed of a start position and an end position in a user text input to provide subtext of the user text input for a typeahead suggestion mechanism independently of a remainder of user text input and dynamically changing the window definition as text is received from the user to the text input; and The dynamic typeahead suggestion system 610 includes a typeahead suggestion providing component 612 for providing a set of typeahead suggestions retrieved for a subtext within a current dynamic window independent of the remainder of user input. The typeahead suggestion providing component 612 generates multiple independent sets of typeahead suggestions using different dynamic windows during the course of the composition of the user input. The typeahead suggestion providing component 612 calls the dynamic typeahead mechanism 640 to provide suggestions for the subtext of the dynamic window. The typeahead suggestion providing component 612 may include a threshold component 613 for providing a set of typeahead suggestions for a subtext of a current dynamic window once a threshold number of characters are received of the subtext.

The dynamic window component 620 may include a prefix based window component 621 for defining the dynamic window with a fixed start position in the user input from which a typeahead mechanism looks for suggestions and an end position that moves to include user input as the user continues typing.

The dynamic window component may include 620 a bidirectional window component 622 for providing a set of typeahead suggestions when a user input is amending previous text input of the user input by defining a current dynamic window that progressively expands in one or both directions from the current input position. The bidirectional window component 622 may define a bidirectional dynamic window with a variable start position and a variable end position that move bidirectionally to include tokens either side of a modifying text input by the user.

The dynamic typeahead suggestion system 610 may include a suggestion selection component 614 for selecting one of the sets of typeahead suggestions for the current dynamic window replacing at least the subtext of the current dynamic window with the text of the selected suggestion.

The dynamic typeahead suggestion system 610 may include a new window triggering component 630 for triggering a new dynamic window when no suggestions are available for the current dynamic window or when a selection is received of a suggestion for the current dynamic window.

The new window triggering component 630 may include a selection triggering component 631 for triggering the start of a new dynamic window with the start position of the new dynamic window at the end of the text of a selected suggestion.

The new window triggering component 630 may include a no suggestion triggering component 632 for starting a new dynamic window when no suggestions are available for the current window, with the start position of the new dynamic window being a next token prefix.

The dynamic typeahead suggestion system 610 may include a final input confirming component 615 for confirming a final text input including any selections from the independent sets of typeahead suggestions.

Figure 7:
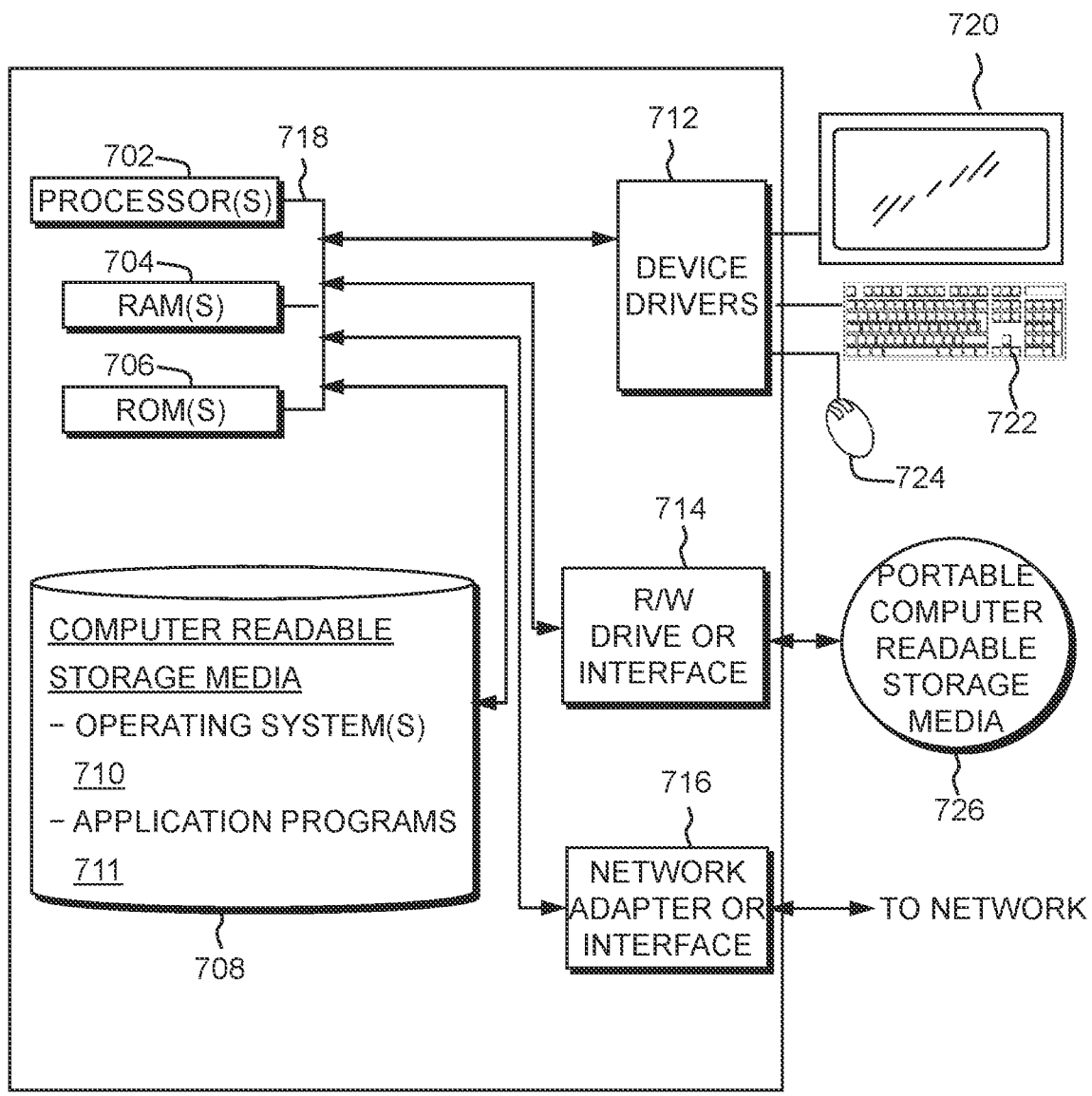
FIG. 7 is a block diagram of an embodiment of a computer system or cloud server in which the present invention may be implemented.

FIG. 7 depicts a block diagram of components of a computing system 600 as used for the described system, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

The computing system can include one or more processors 702, one or more computer-readable RAMs 704, one or more computer-readable ROMs 706, one or more computer readable storage media 708, device drivers 712, read/write drive or interface 714, and network adapter or interface 716, all interconnected over a communications fabric 718. Communications fabric 718 can be implemented with any architecture designed for passing data and/or control information between processors (such as microprocessors, communications and network processors, etc.), system memory, peripheral devices, and any other hardware components within the system.

One or more operating systems 710, and application programs 711, such as the dynamic typeahead suggestion system 610 are stored on one or more of the computer readable storage media 708 for execution by one or more of the processors 702 via one or more of the respective RAMs 704 (which typically include cache memory). In the illustrated embodiment, each of the computer readable storage media 708 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

The computing system can also include a R/W drive or interface 714 to read from and write to one or more portable computer readable storage media 726. Application programs 711 on the computing system can be stored on one or more of the portable computer readable storage media 726, read via the respective R/W drive or interface 714 and loaded into the respective computer readable storage media 708.

The computing system can also include a network adapter or interface 716, such as a TCP/IP adapter card or wireless communication adapter. Application programs 711 on the computing system can be downloaded to the computing device from an external computer or external storage device via a network (for example, the Internet, a local area network or other wide area networks or wireless networks) and network adapter or interface 716. From the network adapter or interface 716, the programs may be loaded into the computer readable storage media 708. The network may comprise copper wires, optical fibers, wireless transmission, routers, firewalls, switches, gateway computers and edge servers.

The computing system can also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714, and network adapter or interface 716 can comprise hardware and software stored in computer readable storage media 708 and/or ROM 706.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
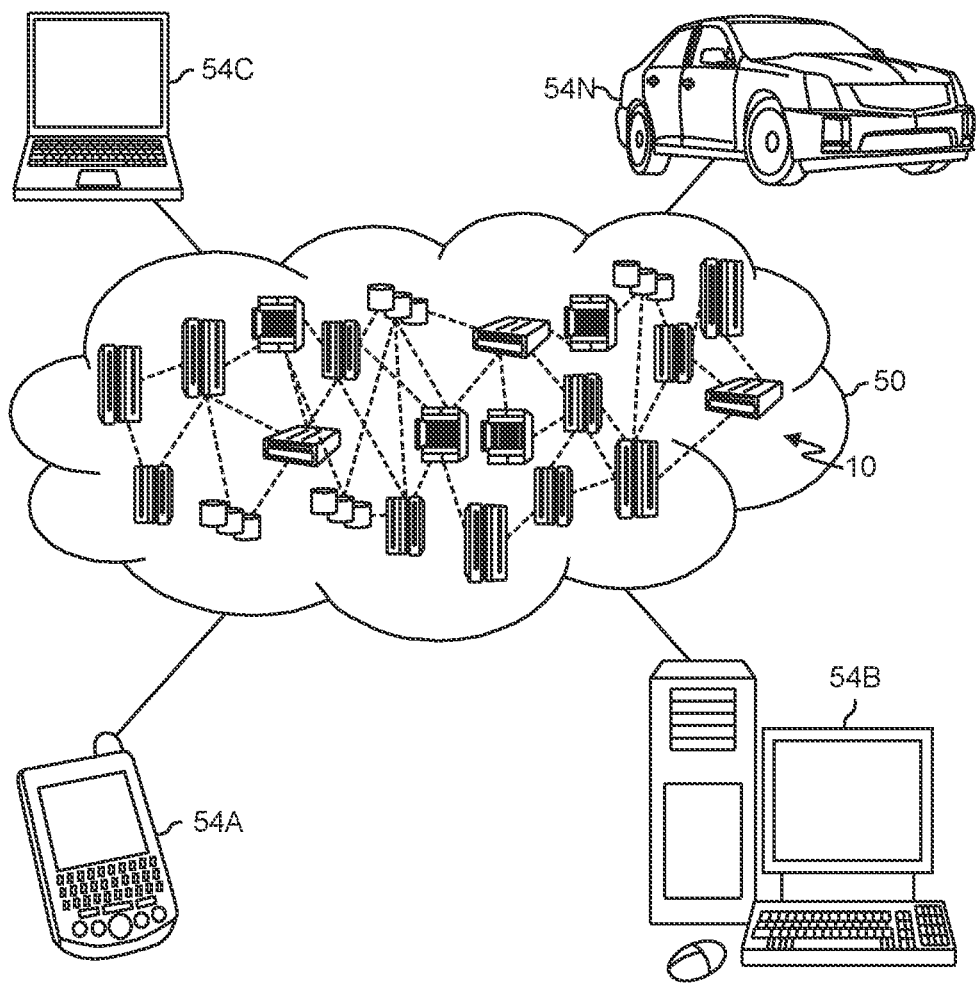
FIG. 8 is a schematic diagram of a cloud computing environment in which the present invention may be implemented.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
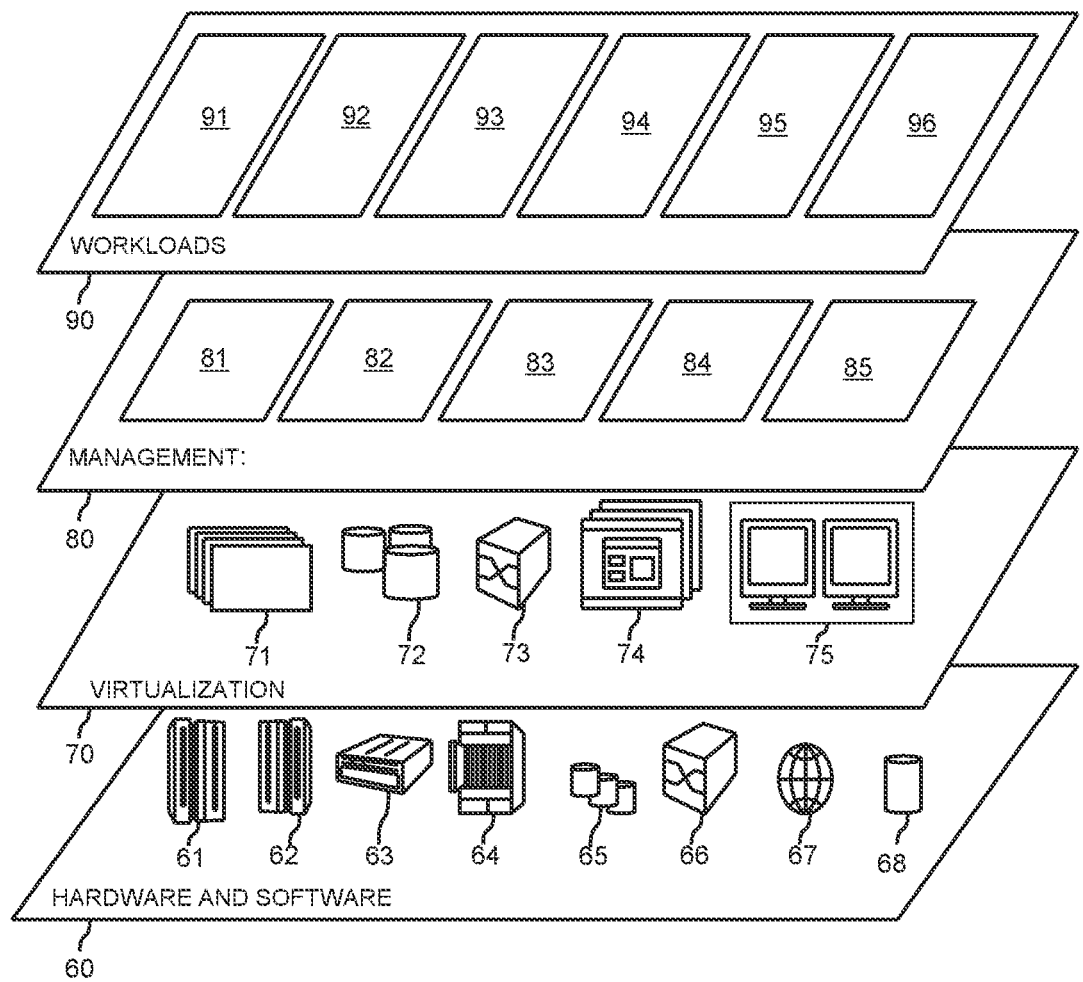
FIG. 9 is a diagram of abstraction model layers of a cloud computing environment in which the present invention may be implemented.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic typeahead suggestion processing 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for dynamic typeahead suggestions for a text input, comprising:
    receiving user input entered by a user in an input interface, wherein the user input is in the form of natural language text formed of a series of characters; and
    providing a set of typeahead suggestions for the user input as the user input is entered or amended by the user in the input interface, wherein the set of typeahead suggestions is retrieved for a subtext of the user input in the input interface surrounded by a current dynamic window, and wherein the set of typeahead suggestions retrieved for the subtext surrounded by the current dynamic window does not include at least a portion of a remainder of the user input in the input interface located outside of the current dynamic window.

2. The computer-implemented method of claim 1, wherein the current dynamic window is dynamically enlarged as the user types the subtext and the set of typeahead suggestions retrieved for the subtext are dynamically updated.

3. The computer-implemented method of claim 1, wherein providing the set of typeahead suggestions uses a fixed start position in the user input from which a typeahead mechanism looks for suggestions and input to the typeahead mechanism updates with text from the fixed start position as the user continues typing and updates the set of typeahead suggestions.

4. The computer-implemented method of claim 1, further comprising:
    selecting one typeahead suggestion of the set of typeahead suggestions for the current dynamic window; and
    replacing at least the subtext of the current dynamic window with text of the selected typeahead suggestion.

5. The computer-implemented method of claim 4, further comprising:
    starting a new dynamic window with the start position of the new dynamic window at the end of text of the selected typeahead suggestion.

6. The computer-implemented method of claim 1, further comprising:
    starting a new dynamic window when no suggestions are available for the current dynamic window, with the start position of the new dynamic window being a next token prefix of the user input.

7. The computer-implemented method of claim 1, wherein providing the set of typeahead suggestions for the subtext of the current dynamic window starts after a threshold number of characters are received of the subtext.

8. The computer-implemented method of claim 1, wherein providing the set of typeahead suggestions when the user is amending previous text input of the user input uses a dynamic window that progressively expands in one or both directions from a current input position.

9. The computer-implemented method of claim 8, wherein progressively expanding the current dynamic window includes progressively expanding the current dynamic window in alternating directions from the current input position.

10. The computer-implemented method of claim 8, wherein progressively expanding the current dynamic window moves the start position of the current dynamic window to include a previous token of the user input in the subtext.

11. The computer-implemented method of claim 8, wherein progressively expanding the current dynamic window moves the end position of the current dynamic window to include a following token of the user input in the subtext.

12. The computer-implemented method of claim 8, further comprising:
   using a wildcard to indicate search text to be inserted in a current subtext.

13. A computer-implemented method for dynamic typeahead suggestions for a text input, comprising:
   defining a current dynamic window in an input interface formed of a start position and an end position in a user text input entered by a user in the input interface, wherein the current dynamic window provides a subtext of the user text input in the input interface for a typeahead suggestion mechanism, and wherein the subtext is independent of a remainder of the user text input in the input interface located outside of the current dynamic window;
   dynamically changing definition of the current dynamic window as the user text input is entered or amended by the user in the input interface; and
   triggering a new dynamic window when no suggestions are available for the current dynamic window, with the start position of the new dynamic window being a next token prefix of the user input.

14. The computer-implemented method of claim 13, wherein the current dynamic window and the new dynamic window is defined as a prefix dynamic window with a fixed start position and a variable end position that moves to include text input by the user.

15. The computer-implemented method of claim 13, wherein the current dynamic window and the new dynamic window is defined as a bidirectional dynamic window with a variable start position and a variable end position that move bidirectionally to include tokens of either side of a modifying text input by the user.

16. A computer system for dynamic typeahead suggestions for a text input, the computer system comprising:
   one or more processors; and
   one or more computer readable storage media storing program instructions executable by the one or more processors, wherein the program instructions include instructions to:
   receive user input entered by a user in an input interface, wherein the user input is in the form of natural language text formed of a series of characters; and
   provide a set of typeahead suggestions for the user input as the user input is entered or amended by the user in the input interface, wherein the set of typeahead suggestions is retrieved for a subtext of the user input in the input interface surrounded by a current dynamic window, and wherein the set of typeahead suggestions retrieved for the subtext surrounded by the current dynamic window does not include at least a portion of a remainder of the user input in the input interface located outside of the current dynamic window.

17. The computer system of claim 16, wherein the program instructions further comprise instructions to define the current dynamic window with a fixed start position in the user input from which a typeahead mechanism looks for typeahead suggestions and an end position that moves as the user continues to enter or amend the user input in the input interface.

18. The computer system of claim 16, wherein the program instructions further comprise instructions to:
   select one typeahead suggestion of the set of typeahead suggestions for the current dynamic window to replace at least the subtext of the current dynamic window with text of the selected typeahead suggestion; and
   trigger the start of a new dynamic window with a start position of the new dynamic window at an end of the text of the selected typeahead suggestion.

19. The computer system of claim 16, wherein the program instructions further comprise instructions to start a new dynamic window when no typeahead suggestions are available for the current dynamic window, with a start position of the new dynamic window being a next token prefix of the user input.

20. The computer system of claim 16, wherein the program instructions further comprise instructions to provide the set of typeahead suggestions for the subtext of the current dynamic window once a threshold number of characters are received of the subtext.

21. The computer system of claim 16, wherein the program instructions further comprise instructions to provide the set of typeahead suggestions when the user is amending previous text of the user input by defining a dynamic window that progressively expands in one or both directions from a current input position.

22. A computer system for dynamic typeahead suggestions for a text input, comprising:
   one or more processors; and
   one or more computer readable storage media storing program instructions executable by the one or more processors, wherein the program instructions include instructions to:
   define a current dynamic window in an input interface formed of a start position and an end position in a user text input entered by a user in the input interface, wherein the current dynamic window provides a subtext of the user text input in the input interface for a typeahead suggestion mechanism, and wherein the subtext is independent of a remainder of the user text input in the input interface located outside of the current dynamic window; and
   trigger a new dynamic window when no suggestions are available for the current dynamic window, with the start position of the new dynamic window being a next token prefix of the user input.

23. The computer system of claim 22, wherein the program instructions further comprise instructions to define the current dynamic window and the new dynamic window with a fixed start position and a variable end position that moves to include text input by the user.

24. The system of claim 22, wherein the program instructions further comprise instructions to define a bidirectional dynamic window with a variable start position and a variable end position that move bidirectionally to include tokens on either side of a modifying text input by the user.

25. A computer program product for dynamic typeahead suggestions for a text input, the computer program product comprising:
   one or more computer readable storage media storing program instructions executable by one or more processors, wherein the program instructions include instructions to:
   receive user input entered by a user in an input interface, wherein the user input is in the form of natural language text formed of a series of characters; and
   provide a set of typeahead suggestions for the user input as the user input is entered or amended by the user in the input interface, wherein the set of typeahead suggestions is retrieved for a subtext of the user input in the input interface surrounded by a current dynamic window, and wherein the set of typeahead suggestions retrieved for the subtext surrounded by the current dynamic window does not include at least a portion of a remainder of the user input in the input interface located outside of the current dynamic window.

\* \* \* \* \*